INVENTOR.
KENNETH F. CROAN
BY
ATTORNEY

INVENTOR.
KENNETH F. CROAN
BY
ATTORNEY

United States Patent Office 3,068,526
Patented Dec. 18, 1962

3,068,526
IMPROVED METHOD OF MOLDING THIN-WALLED ARTICLES FROM EXPANDABLE THERMOPLASTIC BEADS
Kenneth F. Croan, 2165 N. Grand Oaks, Altadena, Calif.
Filed Oct. 10, 1958, Ser. No. 766,495
6 Claims. (Cl. 18—48)

This invention relates to the molding of plastic articles and more particularly to an improved method for forming thin-walled articles from expandable thermoplastic beads and adapted to be utilized in a continuously re-cycling molding operation practicable without labor of any kind.

A moldable plastic material has become available in recent years which is readily moldable into articles of a desired configuration utilizing as a raw material small expandable pellets or beads of thermoplastic material, various compositions of which are now commercially available. After the mold has been charged with a proper quantity of the beads, heat is applied, usually in the form of steam, causing the beads to expand, filling the mold cavity as the soft tacky walls of the beads adhere to one another while maintaining the integrity of the individual cells. Portions of the beads in contact with the mold cavity wall flatten to assume the shape of the mold cavity thereby providing a substantially smooth-surfaced continuous impervious wall.

Various problems are encountered in molding articles from the expandable bead material. For example, it is difficult to distribute the beads throughout the mold cavity either before or while heat is being applied to expand them. Once heat is applied, the individual beads become soft and tacky, readily adhering to one another and to the adjacent surfaces of the cavity thereby preventing the migration of the beads into thinner portions of the cavity. In consequence, the finished article exhibits voids and a far greater density in one portion than in another, particularly the upper and more remote sections.

Various proposals have been advanced to circumvent these problems. One involves the use of semi-expanded beads as the initial charge for the mold. Not only does this complicate and require additional processing steps to the molding operation, but it is not feasible to form articles of higher density and of the requisite strength desired for certain application. Furthermore, this method also depends on substantially fully charging the mold cavity with partially expanded beads, a task of considerable difficulty particularly in the case of molds having small spacing between its opposed wall areas.

Furthermore, all prior methods of charging the mold with beads require accurate measuring of the charge and hand-manipulated methods of charging the cavity. This is particularly true of molds for thin-walled articles. Such limitations prohibit the development of automatic and continuous processing techniques capable of being practiced without human intervention.

By the present invention there is provided a simple and effective technique particularly adaptable for the manufacture of thin-walled articles from expandable thermoplastic beads and capable of being performed fully automatically, including the continuous re-use of the same mold to manufacture duplicate articles and to dispense them into a receiving chamber without need for an operator. The accurate and uniform charging of the mold cavity with expandable beads is carried out by first applying a bead-adhering liquid to one of the mold parts and thereafter passing an excess of beads against the wetted surface until the same has become uniformly and fully covered with adhering beads. Excess non-adhering beads are withdrawn and the mold is then closed and the beads are subjected to suitable heating to expand and fuse the same together into an impervious mass filling the mold cavity. Normally when molding thin-walled parts, only one surface of the mold cavity need be covered whereas, with thicker walled sections all walls of the cavity may be covered with adhering beads. After the beads have been expanded, the mold may be cooled following which the mold is opened and an ejector mechanism ejects the finished article in readiness for deposit on the cavity walls of another film of moistening fluid and a covering of expandable beads.

In a preferred arrangement for practicing the described technique, a plurality of molds are arranged to be indexed sequentially past a liquid applying station, a bead charging and measuring station, a heating station, then through a cooling station or period, following which the mold is opened and the finished article is ejected before the described cycle is repeated. The bead charging operation may be performed in various ways such as by passing a cloud of gas-suspended beads against the moist walls of the mold cavity. This operation is continued until there has been full and adequate opportunity for all portions of the wall to be covered with beads. Non-adhering beads are then withdrawn, the mold is closed and steam is admitted to the cavity under suitable conditions to expand the beads and form the desired article.

Although various liquids including water and others may be used to cause the beads to adhere to the mold walls, it is desirable that the liquid employed contain a wetting agent and a suitable mold release agent facilitating the removal of the molded parts from the mold. By judicious selection of the mold release agent, one may be utilized which additionally has the property of forming a smooth glossy coating on the plastic article. Certain waxes and plastics, such as liquid polyethylene, are suitable for this purpose.

Accordingly, it is a primary object of the present invention to provide an improved method of automatically making thin-walled molded articles using expandable thermoplastic beads.

Another object of the invention is the provision of technique for making articles from expandable plastic beads continuously and automatically without other than general supervisory attention by an operator.

Another object of the invention is the provision of a method for automatically charging a mold cavity with the proper quantity of expandable plastic beads without need for measuring equipment of any kind.

Another object of the invention is the provision of a technique for assuring the proper charging of narrow-walled mold cavities with the proper quantity of uniformly distributed expandable plastic beads even though the cavity space may be only partially filled initially with the expandable beads.

Another object of the invention is the provision of a method for charging a mold cavity with the proper quantity of expandable beads by passing an excess of the beads past the moistened wall of the cavity until the same has become coated with adhering beads and withdrawing all non-adhering beads.

Another object of the invention is the technique of automatically operating molding apparatus indexable past different processing stations, such processing stations being arranged to charge the proper quantity of expandable plastic beads into a mold cavity, process the same under heat and pressure, open the mold and eject the finished article in readiness for receipt of a new charge of expandable beads.

Another object of the invention is the provision of a molding technique for expandable plastic beads in which a mold cavity is moistened with a liquid containing a mold release agent adapted to retain beads coming in contact with the moistened surface and to provide a smooth surface on the finished molded article.

Another object of the invention is the provision of molding technique for the production of articles of manufacture formed from heat expandable thermoplastic beads which articles are characterized by being impervious to fluids and having a smooth surfaced coating intimately bonded to at least one surface thereof.

Another object of the invention is the provision of a method of charging the mold with the proper quantity of expandable plastic beads by circulating an excess of gas-suspended beads over the moistened wall of the mold cavity.

These and other more specific objects will appear upon reading the following specification and claims and upon considering in connection therewith the attached drawings to which they relate.

Referring now to the drawings in which a preferred embodiment of the invention is illustrated:

FIGURE 4 is a fragmentary view on an enlarged scale taken along line 4—4 on FIGURE 1 and showing expandable beads being circulated while suspended into contact with the moistened wall of one of the mold members;

FIGURE 7 is a schematic view of the control circuit for the automatic molding apparatus.

Figure 1:
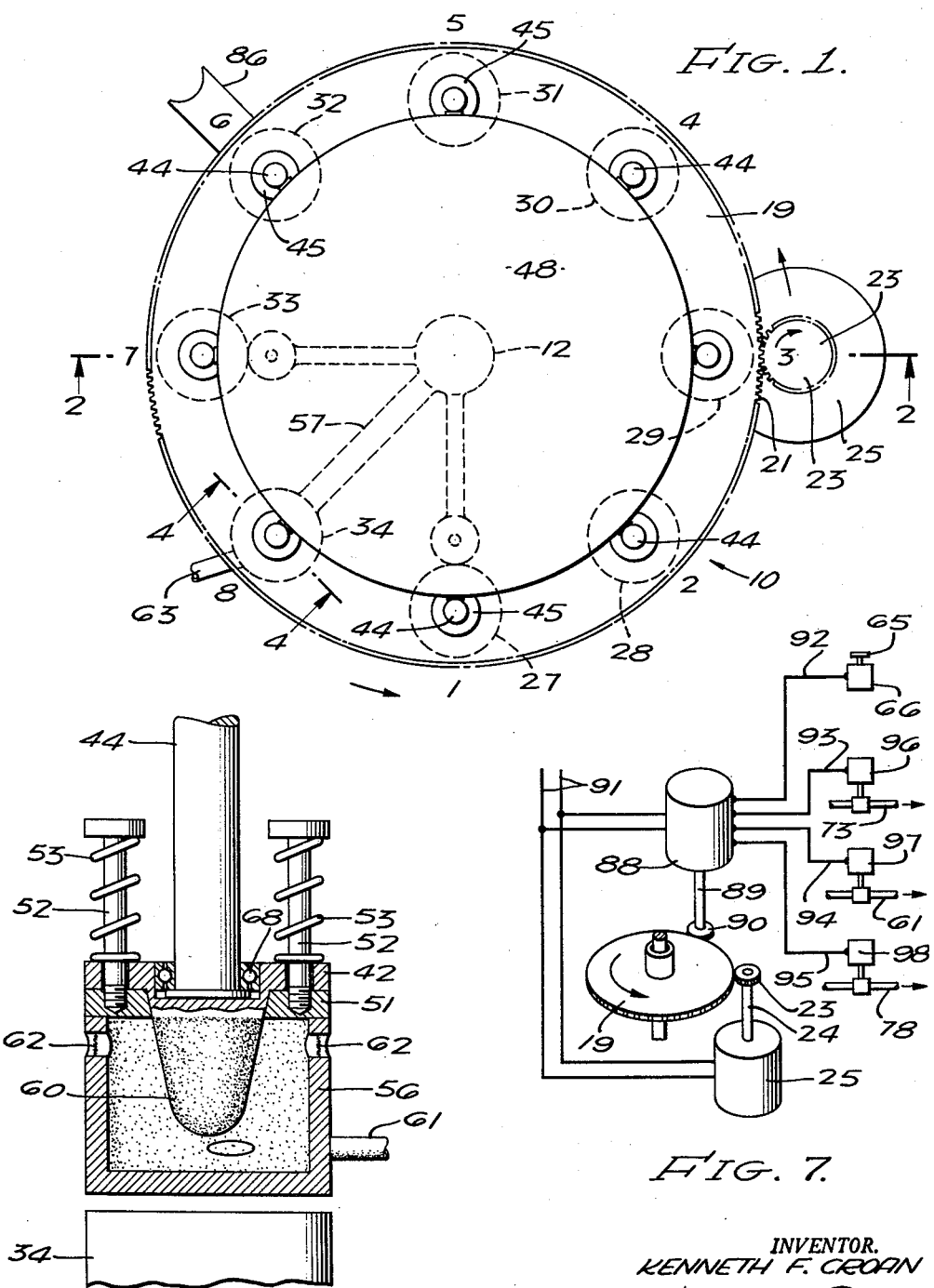
FIGURE 1 is a top plan view of a multiple-cavity molding apparatus having provision for indexing the individual molds sequentially to the various processing stations.
Figure 2:
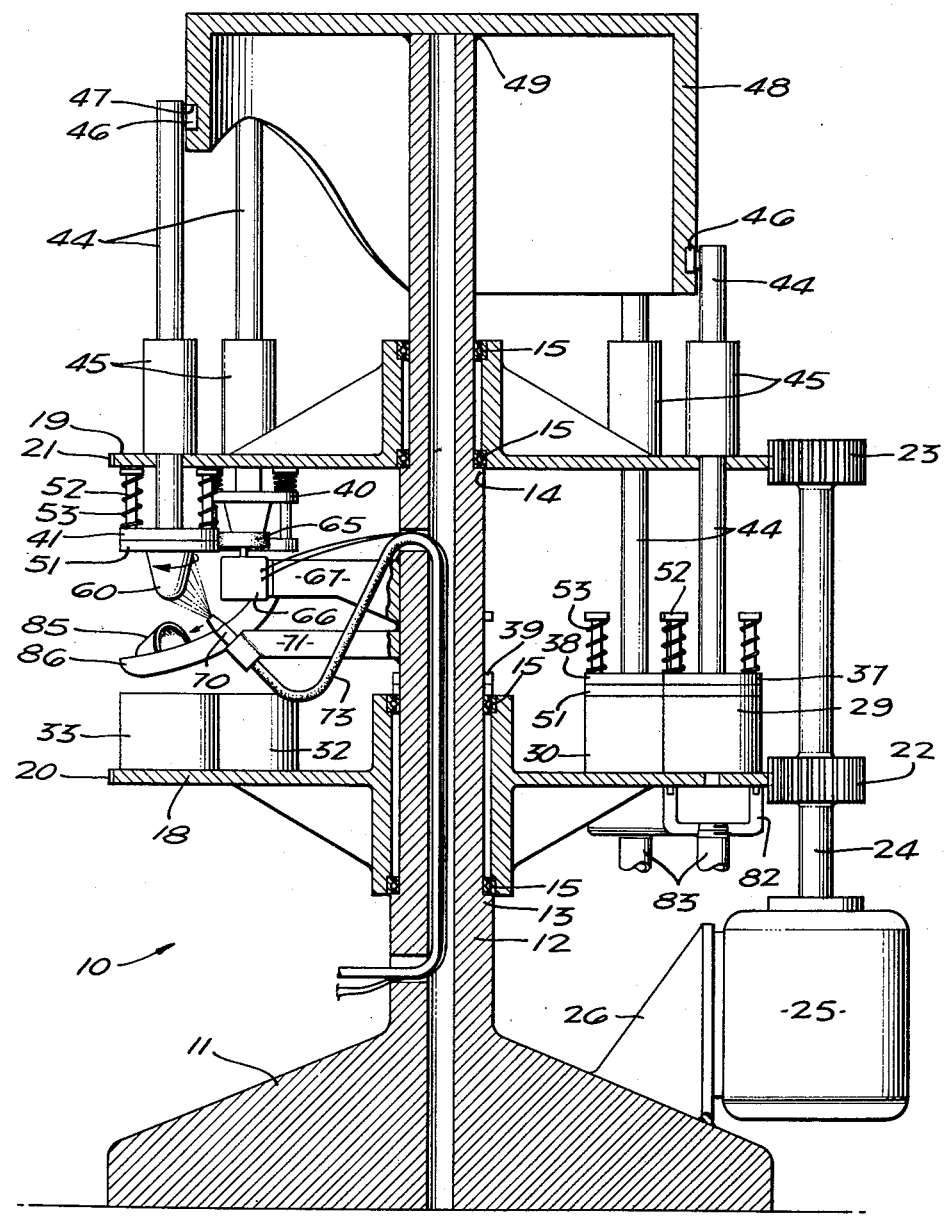
FIGURE 2 is a vertical sectional view taken along line 2—2 on FIGURE 1.

Referring more particularly to FIGURES 1 and 2, a preferred embodiment of suitable apparatus for practicing the present invention is designated generally 10. This apparatus includes a suitable supporting base 11 having a stationary upright hollow column 12 rigid with the base and about which the mold supporting plates are adapted to be rotated. For this purpose, column 12 is provided with axially spaced annular shoulders 13 and 14 rotatably supporting through suitable bearings 15 a pair of plates 18 and 19 each arranged to be indexed in synchronism from station to station. Plates 18 and 19 are here shown as provided with spur teeth 20, 21, respectively, meshing with spur gears 22, 23 fixed to a shaft 24 driven by a very slow speed motor 25. Motor 25 is rigidly mounted on main base 11 as by a bracket 26.

Rigidly secured along the rim of lower plate 18 are a plurality of lower mold members 27, 28, 29, 30, 31, 32, 33 and 34, it being understood that there may be a smaller or larger number of molds depending upon various factors, such as the size of the molded article, wall thickness, and other considerations. By reference to FIGURES 1 and 3 it will be noted that each illustrated mold member occupies one of the eight consecutively numbered index stations through which plates 18 and 19 are indexed in distinct steps, each stationary station being designated by the numerals 1 to 8 as viewed in FIGURE 1.

Figure 3:
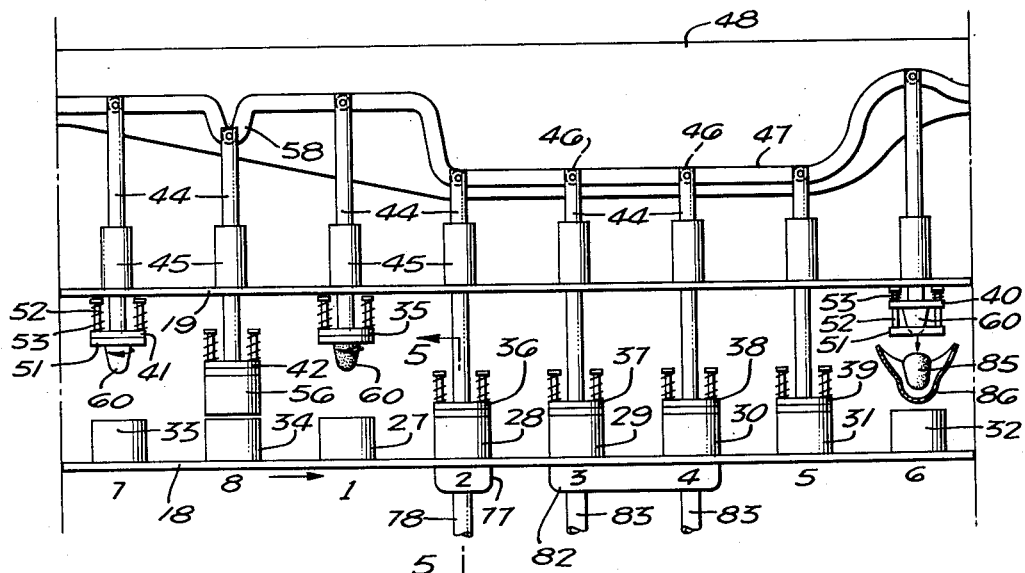
FIGURE 3 is a developed view of essential parts of the molding apparatus showing the relative positions of the several molds in one dwell position of the parts.

The upper mating mold members 35, 36, 37, 38, 39, 40, 41 and 42 are reciprocably mounted for limited to and fro vertical movement relative to upper rotatable plate 19. To this end each upper mold member is mounted on a shaft 44 operating through a stationary guide member 45 fixed to the upper surface of plate 19. The upper ends of shafts 44 are provided with rollers 46 mounted on stationary studs fixed to the sides of these shafts with rollers 46 positioned to roll along the endless cam groove 47 (FIGURE 3). Cam groove 47 is formed in the cylindrical wall of a cam drum 48 rigidly secured to the upper end of column 12 as by welding 49 (FIGURE 2).

As is made clear by FIGURE 3, cam groove 47 is so contoured as to reciprocate shafts 44 and the male portion 60 of the mold members vertically as plate 19 is indexed from station to station. It will be understood that the parts are so designed relative to cam groove 47 that in certain index stations the mold members are closed tightly together, whereas in others they are in open position. In the final station at the end of the operating cycle (station No. 6), the open male mold member is momentarily opened even further and in a manner to actuate the ejector ring to dispense the finished molded article. For this purpose, each male mold member is provided with an ejector ring 51 carrying guide pins 52 projecting freely through openings in the cover of the upper mold member and normally urged to their retracted positions by encircling coil springs 53. The manner in which these components function to effect the ejection of the molded parts at station number 6 will be better understood in following portions of this specification.

Figure 5:
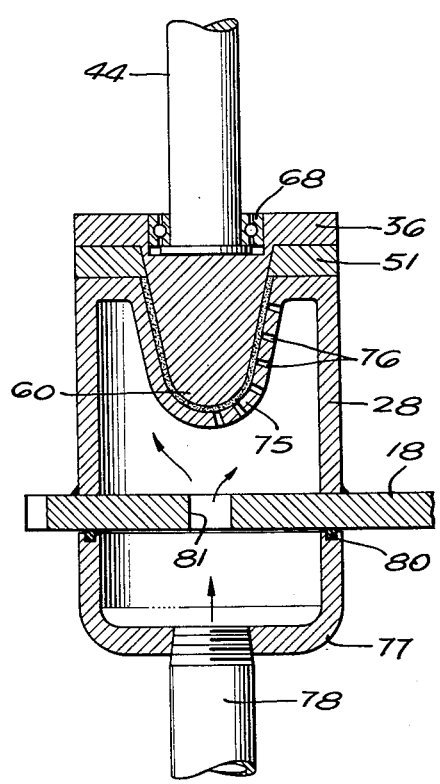
FIGURE 5 is a longitudinal sectional view on an enlarged scale taken along line 5—5 on FIGURE 3.

Before applying the beads to the mold cavity, a pair of open mold members are indexed to station 7 where the rim of the male mold members will be understood to be in frictional driving contact with a rubber-tired disc 65 (FIGURE 2) slowly rotated by a motor 66. This motor is mounted on a supporting bracket 67 rigid with column 12. As is illustrated in FIGURES 4 and 5, each of the male mold members is rotatably mounted on the lower ends of shafts 44 through anti-friction bearings 68. During rotation of the upper mold member at station 7, a suitable liquid is applied to the surface of mold wall 60, as by a spray nozzle 70 supported by a bracket 71 fixed to column 12. The fluid used to coat the cavity wall is supplied through a hose 73 mounted interiorly of the hollow column 12, as are the power leads for motor 66.

Various liquids may be employed to moisten the surface of the cavity wall so that the very light plastic beads will adhere thereto when coming into contact with the moist surface. While not essential, it may be desirable, particularly when manufacturing very thin-walled fragile parts, to utilize a liquid containing a mold release agent. Preferably an agent is selected which is also effective to facilitate detachment of the molded parts from the mold as well as one providing a smooth-surfaced impervious coating on the molded part. Such coating not only fills imperfections but enhances the appearance of the finished article. If desired, this coating material may be suitably colored thereby adding to the aesthetic value of the article. Moistening material suitable for these multifold purposes include waxes, paraffin, beeswax, as well as plastics such as polyethylene in fluid form. Immediately following the application of a layer of this character to member 60, the open moist mold member is indexed to station 8 where a uniformly distributed coating of beads is applied in the manner now to be described.

Referring to FIGURE 4, there is shown a preferred manner of charging the mold cavity with the requisite quantity of uniformly distributed beads. For this purpose, there is rigidly supported opposite station 8 a cuplike chamber 56 supported on the outer end of an arm 57 fixed to the column 12 (FIGURE 1). As is made clear by FIGURES 3 and 4, cup 56 is stationarily supported by bracket 57 in axial alignment with and between the vertically separated mold members. As each pair of mold members is being indexed toward station 8, upper mold member is automatically lowered into cup 56 by an appropriately shaped loop 58 of cam groove 47 (FIGURE 3).

The interior of cup 56 is appreciably larger than the male portion 60 of upper mold member 42. Expandable plastic beads carried in a slightly pressurized air stream are supplied tangentially into cup 56 through a hose connection 61 leading from a suitable supply auxiliary. These enter near the bottom of the chamber causing the very light beads to circulate freely in a cloud circling about the interior of the chamber. The bead-suspending gas escapes through screened openings 62 in the upper portion of the cup. There being an excess of beads in and supplied to the chamber in the manner described, a certain quantity overflows and escapes through a tube 63 (FIGURE 1) opening through the side wall of the cup and may be returned to the supply hopper, not shown.

After the mold member has been charged with the beads as described, it may be inspected as it is indexed past station 1 to station 2 where it is lowered into the mating lower or female mold member. The interior of the female mold members appropriate for molding a thin-walled rounded cup-shaped article is best shown in FIGURE 5. Lower mold member 28 includes a generally cylindrical outer wall and a cup-shaped inner wall 75 of slightly larger size than male member 60. When forming a thin-walled article of this type a single layer of beads uniformly distributed over cavity surface 60 suffices to fill the entire cavity when these beads are fully expanded. Wall 75 is preferably provided with a multiplicity of fine perforations 76 through which steam may be introduced into the mold cavity to expand and fuse the beads.

As is best shown in FIGURES 3 and 5, steam under appropriate pressure of a few pounds is supplied to the interior of the mold members by way of a manifold 77 which may underlie a single mold or span the distance between several adjacent index stations and having a steam supply pipe 78. Manifold 77, open along its top rim edge, is provided with a suitable sealing gasket ring 80 bearing against the underside of indexing plate 18. Each lower mold member has an opening 81 through its bottom adapted to overlie and provide communication with the interior of manifold 77 when the mold members are opposite this manifold. Desirably, ejector rings 51 have a loose fit with the juxtaposed surfaces of members 28 and 36 thereby enabling excess steam to escape. Preferably steam at predetermined temperature and under several pounds pressure (for example, 10 to 40 p.s.i.) is admitted to the mold cavity in accordance with techniques well known to those skilled in this art for the purpose of expanding and fusing the plastic beads.

During indexing of the molds past stations 3, 4 and 5, cooling fluid such as water is circulated through at least the lower mold sections by way of a manifold 82 and water pipes 83, 83. It is pointed out that manifold 82 is generally similar to steam manifold 77. As shown in FIGURE 3, manifold 82 does not extend beneath station 5 (although it may), the purpose being to permit drainage of water from the mold before the completed article is discharged from the apparatus at station 6.

Figure 6:
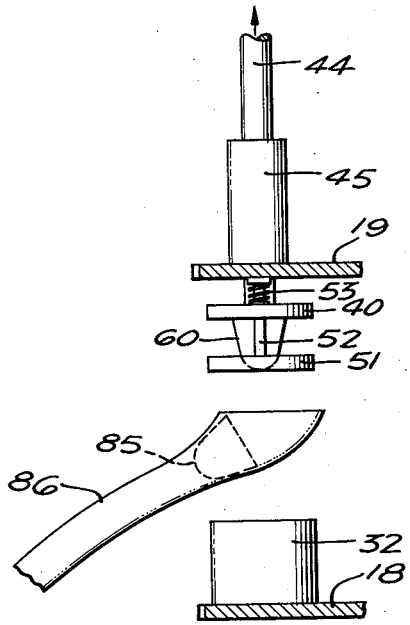
FIGURE 6 is a fragmentary view on an enlarged scale showing a completed molded article falling away from the mold immediately after being ejected therefrom.

As the finished part is indexed from station 5 to 6, cam groove 47 not only opens the mold but elevates it sufficiently as to depress ejector ring 51 by contacts of its spring biased pins 52 with the underside of plate 18. This action lowers ring 51 relative to male portions 60 of the mold and ejects the finished molded article 85 (FIG. 6) into an underlying receiving trough 86 leading to a receiving container for the finished parts.

Referring to FIGURE 7, there is shown a suitable programming control circuit for use in automatically controlling the operation of the described apparatus. To assure accurate synchronization of the control circuits for the several valves and motors with the indexing of the molds, a multiple circuit programming timer of any suitable character 88 is arranged to be driven through a shaft 89 having fixed thereto a gear 90 meshing with teeth 21 on one of the indexing plates, as plate 19. Power supply wires 91 for main driving motor 25 include a branch extending to the timer mechanism within casing 88. Independent circuits arranged to be energized in the desired sequence and for preselected periods by timer mechanism 88 include a circuit 92 leading to motor 66 and operable to rotate the male mold member during the spraying operation. Also included are independent circuits 93, 94 and 95. Circuit 93 leads to an electromagnetic valve 96 controlling the flow of liquid to spray nozzle 70, whereas circuit 94 leads to a similar valve 97 controlling the flow of gas-suspended beads through supply hose 61. Likewise, circuit 95 controls a magnetic valve 98 located in end steam supply line 78 for manifold 77.

It is pointed out that the timer mechanism is arranged to energize each of circuits 92 to 95 independently and for predetermined periods as found most suitable for performing the functions controlled by each. For example, motor 66 employed to rotate the male molds during application of the liquid spray may be energized for the same or a different period than circuit 93 controlling the flow of liquid to the spray nozzle. If the same period of energization for each is feasible, then circuits 92 and 93 may be connected in parallel with the timer. It may also be feasible to connect circuit 95 in parallel with circuits 92 and 93 since approximately the same time period is found suitable for passing beads in contact with the liquid surface as is required in applying the spray to another mold. In some cases it may be unnecessary to discontinue the supply of steam to manifold 77 during indexing of the molds from station to station. In this event, the steam valve may remain open so long as the apparatus is in operation.

Although the mold members herein illustrated are designed for use in making an article having only thin walls, it is to be understood that neither the method nor the apparatus contemplated by this invention is so limited. On the contrary, articles having both thin and thick sections may be molded automatically and in a continuous manner without departure from the scope of this invention. To illustrate, let it be assumed the article to be molded is generally tumbler-shaped but with an unusually thick bottom. The mold cavity would be similarly shaped and the indexing apparatus would include an extra station at which known equipment would charge the bottom of the lower mold with an accurately measured charge of expandable beads sufficient to form the major portion of the thick bottom of the tumbler, the charge for the thin-walled upper portion of the tumbler being determined and uniformly applied to the wetted wall of the upper cavity according to the technique described above. Preferably, the latter described portion of the charge is applied to the upper mold prior to the charging of the lower mold with a measured quantity of bulk beads. The described dual charging technique may be varied as necessary to suit the needs of a particular article of thick and thin wall sections without departure from the spirit and principles of this invention.

While the particular technique and apparatus for molding thin-walled articles from expandable plastic beads herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. That improvement in determining and filling a thin-walled mold cavity with the proper quantity of expandable plastic beads in a thin layer adhering to the mold cavity surface which comprises moistening at least one wall of a mold cavity with a liquid to which the plastic beads will adhere, passing a surplus of beads into contact with said moistened mold wall until the same is substantially uniformly coated with adhering beads, rejecting surplus non-adhering beads, closing the mold, and subjecting the beads retained on the cavity wall to processing under heat until the beads have expanded and fused together in a mass filling the mold cavity.

2. That improvement in the manufacture of thin-walled articles from expandable plastic beads which comprises, indexing a plurality of molds having thin cavities interiorly thereof past a plurality of processing stations including a station for moistening a wall of each mold cavity with a liquid to which plastic beads will adhere, passing an excess of beads into contact with the moistened surface of the mold cavity to collect a layer of beads one bead deep, rejecting non-adhering beads, closing the mold cavity, expanding and fusing the adhering beads together by the use of heat, cooling the molded article, opening the mold and dispensing the completed article before using that mold to form another article in a repeat cycle.

3. That improvement in the manufacture of articles having thin and thick walled sections from expandable plastic beads which comprises, charging the portions of a mold cavity for the thick walled sections of the article with a measured charge of expandable beads sufficient to form the thick walled sections of the article, coating a moistened wall of the mold cavity used in forming the thin walled sections of the article with a single uniformly distributed layer of expandable beads adhering to said moistened wall and adequate upon curing the beads to fill the thin-walled portions of the mold cavity, closing the charged mold, restricting the charge of beads in the thin-walled portions of the mold cavity to the beads in the layer adhering to the said moistened wall, and subjecting the plastic bead charge to heat and pressure.

4. That improvement defined in claim 3 characterized in that said coating of expandable beads is assured by first applying a film of liquid to said cavity wall of a character effective to hold captive expandable beads brought into contact therewith and thereafter passing the beads into contact with said liquid film for cohesive attachment to and retention by said liquid film.

5. That improvement defined in claim 4 characterized in that the beads brought into contact with said liquid film are substantially free of said liquid before contact whereby said beads adhere to said liquid film and not to one another to provide a single layer of beads.

6. That method of making a thin-walled article of manufacture from expandable thermoplastic beads fused into a unitary mass of a desired configuration with the beads substantially uniformly distributed throughout the mold cavity and having an impervious smooth-surfaced coating which method comprises, coating at least one wall of said thin-walled mold cavity with coating material in liquid form, charging the mold cavity with a charge of expandable thermoplastic beads substantially uniformly distributed in a layer against the surface of the mold cavity, utilizing the cohesive property of said liquid for said beads to hold said layer of beads distributed over all mold cavity surfaces coated with said liquid, excluding beads from the mold cavity not cohesively attached to the coated wall of the mold cavity, closing the mold cavity and subjecting the mold to heat under conditions to expand said beads to fill said cavity completely and fuse them into a unitary mass against said coating, cooling said mold and thereafter removing said article from the mold cavity.

References Cited in the file of this patent

UNITED STATES PATENTS

| | | |
|---|---|---|
| 1,846,999 | Eaton | Feb. 23, 1932 |
| 2,454,910 | Carr | Nov. 30, 1948 |
| 2,498,149 | Bower | Feb. 21, 1950 |
| 2,606,343 | Cooper | Aug. 12, 1952 |
| 2,672,652 | Howe et al. | Mar. 23, 1954 |
| 2,678,293 | McMillan et al. | May 11, 1954 |
| 2,688,766 | Huckfeldt | Sept. 14, 1954 |
| 2,736,925 | Heisler et al. | Mar. 6, 1956 |
| 2,765,248 | Beech et al. | Oct. 2, 1956 |
| 2,787,809 | Stastny | Apr. 9, 1957 |
| 2,827,227 | Lipsius | Mar. 25, 1958 |
| 2,862,834 | Hiler | Dec. 2, 1958 |
| 2,891,284 | Levin et al. | June 23, 1959 |
| 2,915,788 | Engel | Dec. 8, 1959 |
| 2,954,589 | Brown | Oct. 4, 1960 |
| 3,015,132 | Bunting | Jan. 2, 1962 |

FOREIGN PATENTS

| | | |
|---|---|---|
| 792,844 | Great Britain | Apr. 2, 1958 |

OTHER REFERENCES

McClelland, C. P.: India Rubber World, "Carbowax" Compounds and Polyethylene Glycols Aid in Rubber Fabricating, Feb. 1952, pp. 579–581.

Koppers booklet, Dylite-Expandable-Polystyrene, 1954, pp. 3, 19 and 29.